(12) United States Patent
Park et al.

(10) Patent No.: US 8,937,624 B2
(45) Date of Patent: Jan. 20, 2015

(54) METHOD AND APPARATUS FOR TRANSLATING MEMORY ACCESS ADDRESS

(75) Inventors: Gi Ho Park, Seoul (KR); Won Chang Lee, Seongnam-si (KR); Shi Hwa Lee, Seoul (KR); Do Hyung Kim, Hwaseong-si (KR); Joon Ho Song, Hwaseong-si (KR); Sung Uk Jeong, Seoul (KR)

(73) Assignees: Samsung Electronics Co., Ltd., Suwon-Si (KR); Industry-Academia Cooperation Group of Sejong University, Seoul (KR)

( * ) Notice: Subject to any disclaimer, the term of this patent is extended or adjusted under 35 U.S.C. 154(b) by 556 days.

(21) Appl. No.: 13/297,492

(22) Filed: Nov. 16, 2011

(65) Prior Publication Data

US 2012/0124324 A1 May 17, 2012

(30) Foreign Application Priority Data

Nov. 16, 2010 (KR) .................. 10-2010-0114020

(51) Int. Cl.
| | |
|---|---|
| *G06F 12/06* | (2006.01) |
| *G06F 12/00* | (2006.01) |
| *G09G 5/37* | (2006.01) |
| *G09G 5/399* | (2006.01) |
| *G06F 13/28* | (2006.01) |
| *G09G 5/39* | (2006.01) |
| *G11C 8/00* | (2006.01) |
| *G06F 12/02* | (2006.01) |

(52) U.S. Cl.
CPC ........ *G06F 12/0607* (2013.01); *G06F 12/0207* (2013.01); *G06F 2212/1024* (2013.01)
USPC ........... 345/572; 345/564; 345/561; 345/540; 345/570; 345/531; 365/230.03

(58) Field of Classification Search
USPC .................................................. 711/E12.078
See application file for complete search history.

(56) References Cited

U.S. PATENT DOCUMENTS

| | | | | |
|---|---|---|---|---|
| 6,784,889 | B1 * | 8/2004 | Radke ........................... | 345/531 |
| 7,016,418 | B2 * | 3/2006 | Wang et al. .............. | 375/240.24 |
| 7,110,663 | B1 | 9/2006 | Tsukagoshi et al. | |
| 2004/0100472 | A1 | 5/2004 | Linzer et al. | |
| 2008/0013929 | A1* | 1/2008 | Lee ................................ | 388/811 |
| 2008/0055325 | A1* | 3/2008 | Seigneret et al. ............. | 345/538 |

FOREIGN PATENT DOCUMENTS

| | | |
|---|---|---|
| KR | 10-2005-0087729 | 8/2005 |
| KR | 10-2007-0075560 | 7/2007 |
| KR | 10-2008-0020066 | 3/2008 |

OTHER PUBLICATIONS

Joon-Ho Song et al, "High-performance memory interface architecture for high-definition video coding application", International Conf. on Image Processing (ICIP 2010) USA, Sep. 26, 2010, pp. 3745-3748.
Newman G., "Memory Management Support for Tiled Array Organization", ACM Sigarch Computer Architecture News, ACM Special Interest Group on Computer Architecture, vol. 20, No. 4, Sep. 1, 1992, pp. 23-30.
European Search Report dated Dec. 13, 2012 issued in corresponding European Patent Application 11189341.8.

\* cited by examiner

*Primary Examiner* — Maurice L McDowell, Jr.
*Assistant Examiner* — Donna J Ricks
(74) *Attorney, Agent, or Firm* — Staas & Halsey LLP

(57) ABSTRACT

A memory access address translating apparatus and method may each classify pixels included in an input image into a plurality of tiles, and may generate a new memory for each of the successive tiles to enable the successive tiles, among a plurality of tiles, to be stored in different banks.

18 Claims, 12 Drawing Sheets

FIG. 8
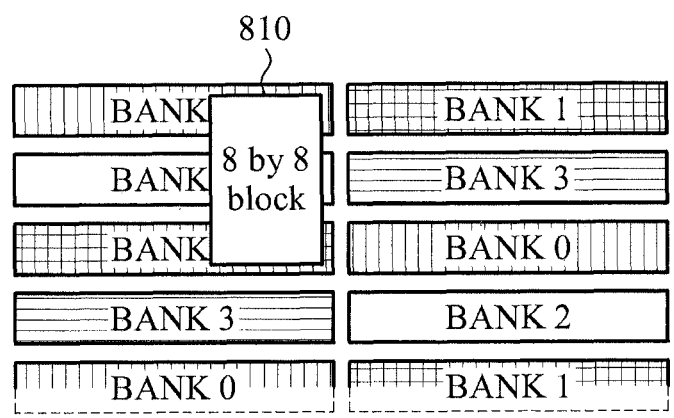
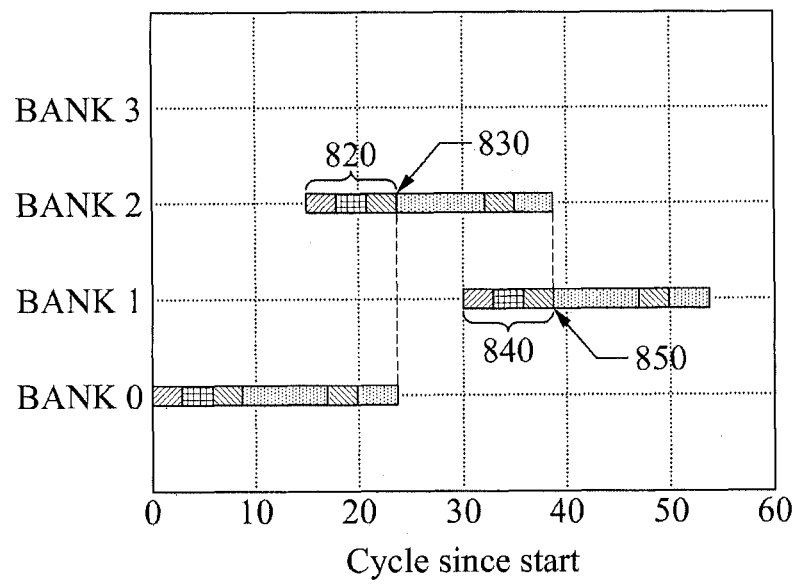

FIG. 9
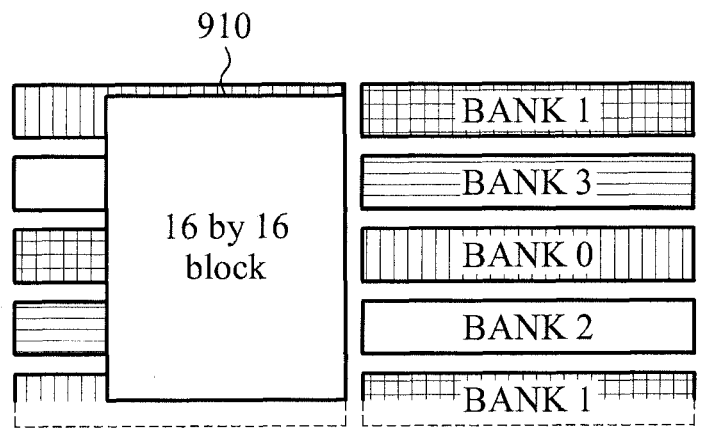
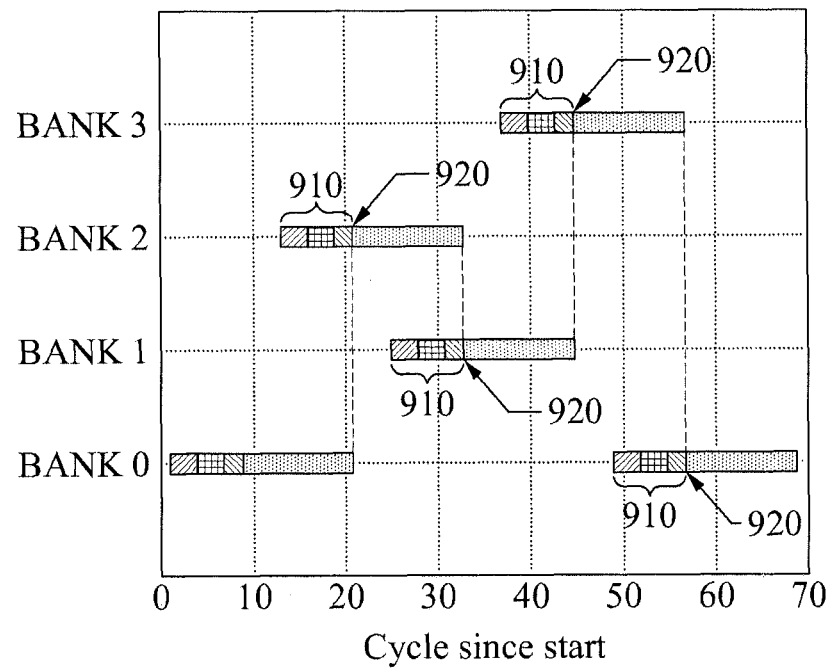

METHOD AND APPARATUS FOR TRANSLATING MEMORY ACCESS ADDRESS

CROSS-REFERENCE TO RELATED APPLICATIONS

This application claims the priority benefit of Korean Patent Application No. 10-2010-0114020, filed on Nov. 16, 2010, in the Korean Intellectual Property Office, the disclosure of which is incorporated herein by reference.

BACKGROUND

1. Field

One or more example embodiments of the present disclosure relate to a memory access address translating apparatus and method, and more particularly, to a memory access address translating apparatus and method using a bank interleaving scheme.

2. Description of the Related Art

A memory, such as a dynamic random access memory (DRAM), an asynchronous DRAM (SDRAM), and the like, may include a plurality of banks. A memory system may allocate a memory address to each of the plurality of banks.

Referring to FIG. 1A, the memory system may allocate the memory address in an order 10 of a bank, a row, and a column. In this example, the most significant two bits 110 may be used as a bank address that distinguishes the plurality of banks, twelve upper bits 120 may be used as a row address that distinguishes a plurality of rows, and remaining nine lower bits 130 may be used as a column address that distinguishes a plurality of columns. A single memory may include a plurality of banks, a bank may include a plurality of rows, and a row may include a plurality of columns. In this example, a DRAM having a 16-bit output may have a bank of 4 Mbytes.

Referring to FIG. 1B, the memory system may allocate a memory address in an order 20 of a row, a bank, and a column. In this example, a single memory may include a plurality of rows, a row may include a plurality of banks, and a bank may include a plurality of columns. In this example, a DRAM having a 16-bit output may have a bank of 1 Kilobyte.

In general, the memory system may store, in a memory, input images based on a macro block unit. Here, data stored in each successive macro block is usually stored in the same bank.

To read the data stored in the bank, preparation time to prepare the reading may be required. Accordingly, when a plurality of data stored, in the same bank is read, overhead may increase due to the preparation time expended for each piece of data.

Thus, there is a desire for a memory access technology that may reduce or remove the preparation time expended for accessing a memory and that may decrease overhead.

SUMMARY

One or more example embodiments of the present description may store, in different banks, successive tiles among a plurality of tiles included in an input image and thus, may reduce overhead caused by accessing a memory.

The foregoing and/or other aspects are achieved by providing a memory access address translating apparatus, the apparatus including an address allocating unit to classify a plurality of pixels included in an input image based on a tile unit, and to allocate a memory address to each of a plurality of tiles, an address generating unit to generate, for each successive tile among the plurality of tiles, based on a corresponding memory address allocated to each of the plurality of tiles, a new memory address to enable the successive tiles to be stored in different memory banks, and each of the plurality of tiles includes pixel information associated with the plurality of pixels included in the input image, and a memory controller to store each of the successive tiles in a corresponding new memory address.

The address generating unit may generate new memory addresses, based on a bit indicating an X coordinate address of a tile and a bit indicating a Y coordinate address of the tile in the corresponding memory address allocated to each of the plurality of tiles, and the corresponding memory address allocated to each of the plurality of tiles including frame information associated with a frame that is associated with pixels included in the tile, the X coordinate address of the tile, and the Y coordinate address of the tile.

The memory controller may store, in different banks based on new memory addresses, the successive tiles that are successive in a direction of an up, down, left, and right alignment based on a tile of the plurality of tiles.

The apparatus may further include a tile reading unit to read, from different banks, the successive tiles of the plurality of tiles and a tile outputting unit to output the read tiles.

The foregoing and/or other aspects are achieved by providing a memory access address translating method, the method including classifying a plurality of pixels included in an input image based on a tile unit, and allocating a memory address to each of a plurality of tiles, generating, for each of the successive tiles among the plurality of tiles based on a corresponding memory address allocated to each of the plurality of tiles, a new memory address to enable successive tiles of the plurality of tiles to be stored in different memory banks, and each of the plurality of tiles including pixel information associated with the plurality of pixels included in the input image, and storing each of the successive tiles in a corresponding new memory address.

The generating may include performing an exclusive or (XOR) operation with respect to the most significant two bits indicating an X coordinate address of a tile and the least significant two bits indicating a Y coordinate address of the tile, respectively, and allocating results of the XOR operation to the most significant two bits indicating an X coordinate address of the new memory address, respectively.

The storing includes storing, in different banks based on new memory addresses, the successive tiles that are successive in a direction of an up, down, left, and right alignment based on a tile of the plurality of tiles.

The method may further include reading, from different banks, the successive tiles of the plurality of tiles, and outputting the read tiles.

The foregoing and/or other aspects are achieved by providing a memory access address translating apparatus. The apparatus includes an address allocating unit to classify a plurality of pixels included in an input image based on a tile unit, and to allocate a memory address to each of a plurality of tiles, wherein each of the plurality of tiles includes pixel information associated with the plurality of pixels included in the input image, an address generating unit to generate, for each successive tile among the plurality of tiles, a new respective memory address by performing a logical operation on a corresponding memory address allocated to each successive tile among the plurality of tiles, and a memory controller to store each of the successive tiles in different memory banks based on the new respective memory address.

The foregoing and/or other aspects are achieved by providing a memory access address translating method. The method includes classifying a plurality of pixels included in an input image based on a tile unit, allocating a memory address to each of a plurality of tiles wherein each of the plurality of tiles includes pixel information associated with the plurality of pixels included in the input image, generating, for each successive tile among the plurality of tiles, a new respective memory address by performing a logical operation on a corresponding memory address allocated to each successive tile among the plurality of tiles, and storing, by way of a memory controller, each of the successive tiles in different memory banks based on the new respective memory address.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIGS. 8 and 9 are diagrams illustrating a process that outputs tiles stored in a memory bank according to example embodiments;

DETAILED DESCRIPTION

Figure 1A:
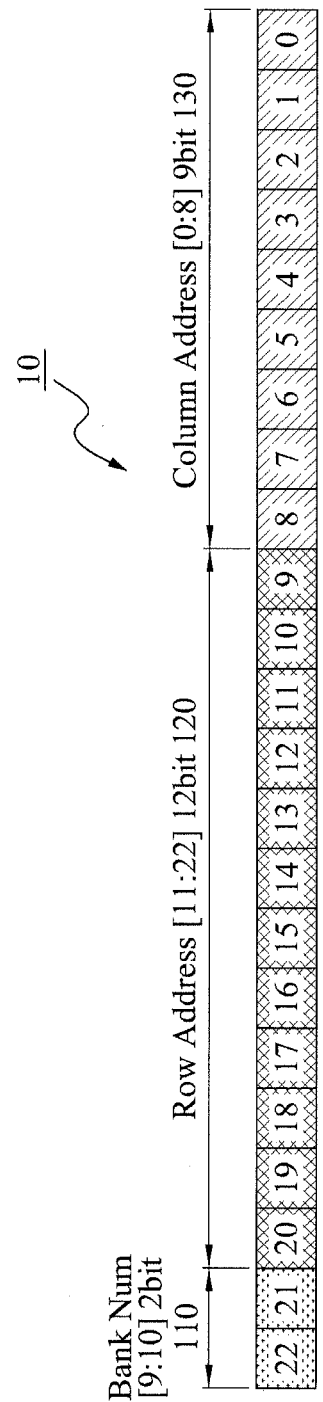
FIGS. 1A and 1B are diagrams illustrating that a memory address is allocated to each of a plurality of banks included in a memory according to example embodiments.
Figure 1B:
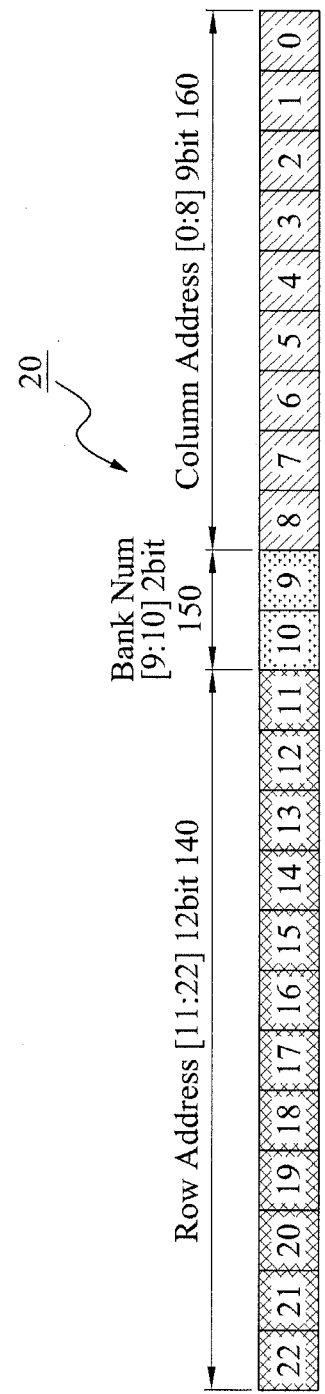

Reference will now be made in detail to embodiments, examples of which are illustrated in the accompanying drawings, wherein like reference numerals refer to the like elements throughout. Embodiments are described below to explain the present disclosure by referring to the figures.

Figure 2:
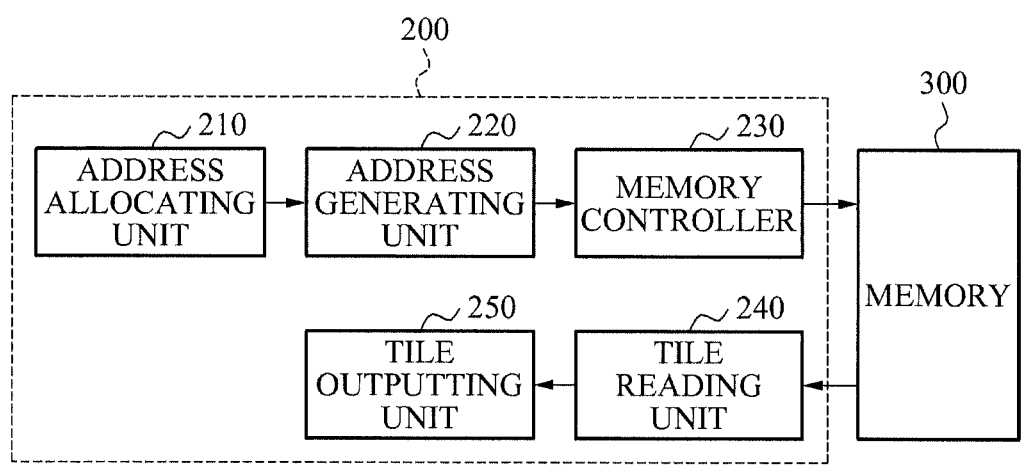
FIG. 2 is a block diagram illustrating a configuration of a memory access address translating apparatus according to example embodiments.

FIG. 2 illustrates a configuration of a memory access address translating apparatus 200 according to example embodiments.

Referring to FIG. 2, the memory access address translating apparatus 200 may include, for example, an address allocating unit 210, an address generating unit 220, a memory controller 230, a tile reading unit 240, and a tile outputting unit 250. In this example, the memory access address translating apparatus 200 may store, in a memory 300, an input image based on a tile unit, and may read the input image stored in the memory 300 based on the tile unit to transmit or playback the read input image.

First, the address allocating unit 210 may classify, based on the tile unit, a plurality of pixels included in the input image, and may allocate a memory address to each of a plurality of tiles. In this example, a tile may include pixel information associated with the plurality of pixels included in the input image. The pixel information may include luminance information Y and chrominance information (U, V). The process that allocates the memory address to each of the plurality of tiles will be described with reference to FIGS. 3 through 5.

The address generating unit 220 may generate a new memory address for each of the successive tiles based on the memory address allocated to each of the plurality of tiles, based on a corresponding memory address. In this example, the address generating unit 220 may generate new memory addresses to enable tiles that are successive in a direction of an up, down, left, and right alignment to be stored in different memory banks. In this example, the process that generates the new memory address will be described in more detail at least with reference to FIG. 6.

The memory controller 230 may store, based on the generated new memory addresses, the plurality of tiles in banks of the memory 300, respectively. In this example, the new memory addresses may be generated to enable the successive tiles to be stored in different banks from each other. Accordingly, the memory controller 230 may store, based on the new memory addresses, the successive tiles, among the plurality of tiles, in different banks. In this example, the memory controller 230 may store pixel information of a plurality of pixels included in a corresponding tile, in a location that is indicated by the new memory address, in a bank area.

Figure 3:
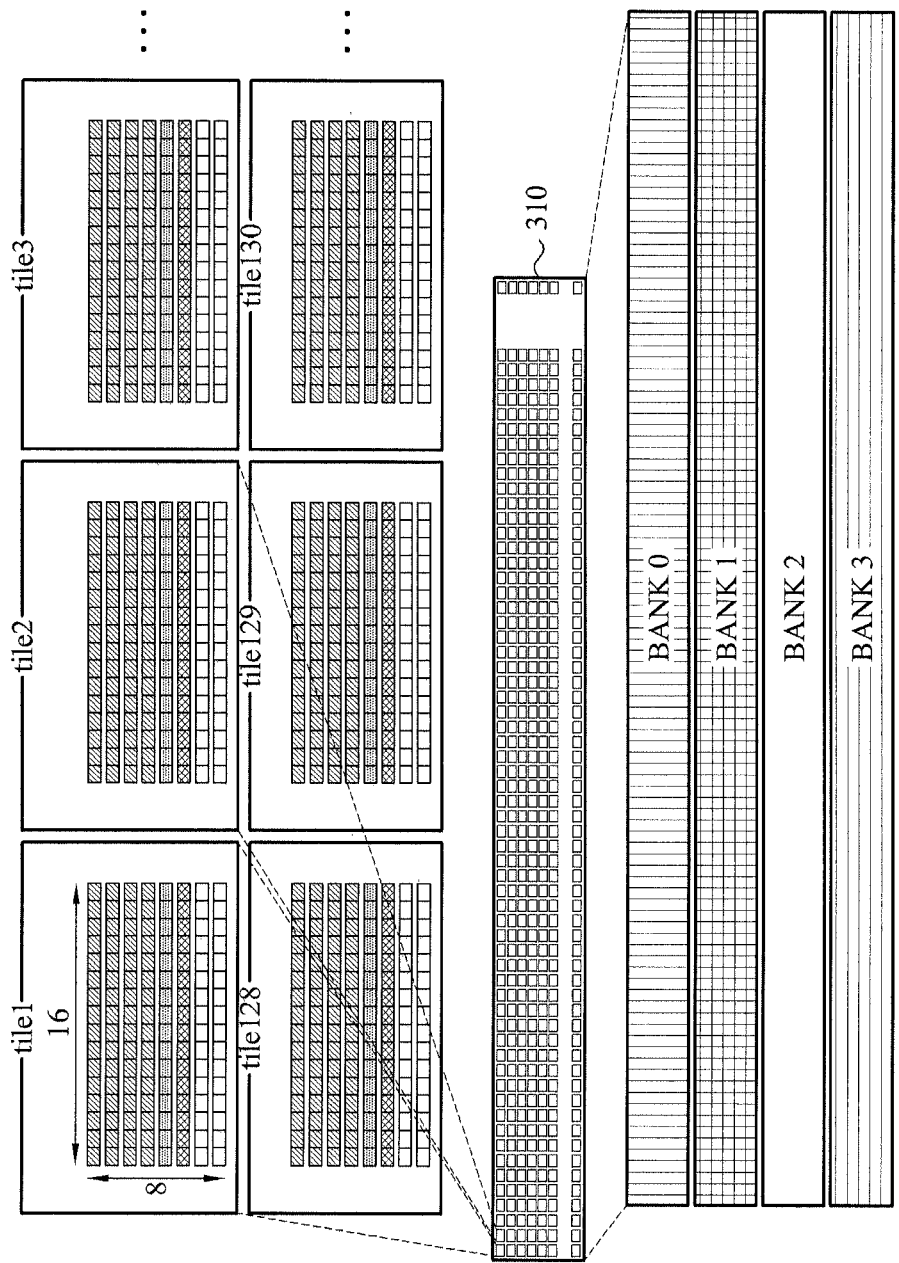
FIG. 3 is a diagram illustrating an example of a memory address that is configured in an order of a bank address, a row address, and a column address according to example embodiments.
Figure 4:
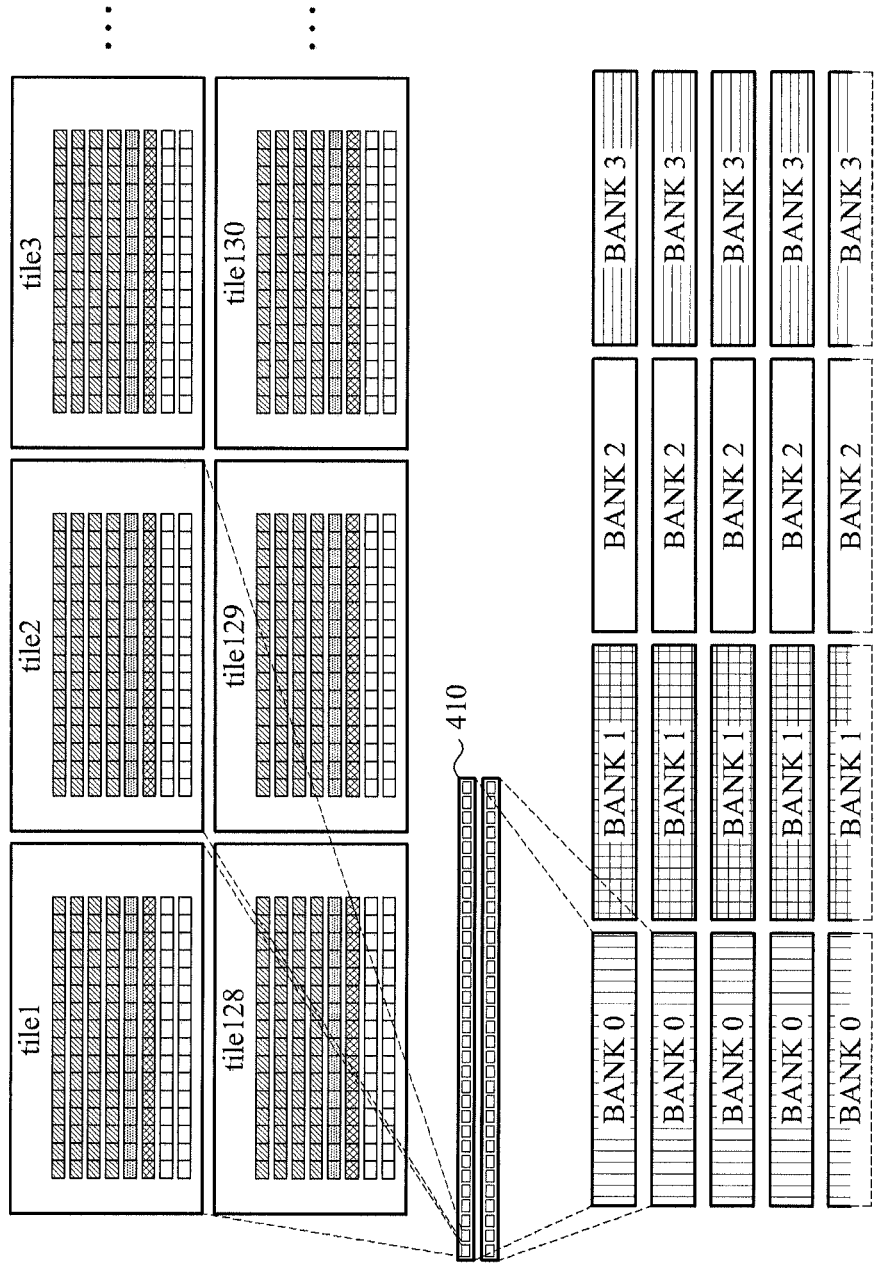
FIG. 4 is a diagram illustrating an example of a memory address that is configured in an order of a row address, a bank address, and a column address according to example embodiments.

For example, referring to FIGS. 3 and 4, the memory controller 230 may store, in different banks, successive tiles, that is, tiles that are successive in a direction of an up, down, left, and right alignment based on a tile 129, such as a tile 2, a tile 128, and a tile 130. Accordingly, the memory controller 230 may store the tile 129 in a bank 0, may store the tile 2 in a bank 1, may store the tile 128 in a bank 2, and may store the tile 130 in a bank 3. In the same manner, the memory controller 230 may store successive tiles based on the tile 2, such as, the tile 1, the tile 129, and the tile 3, in different banks. The tile 2 may be stored in the bank 1, the tile 1 may be stored in the bank 3, the tile 3 may be stored in the bank 2, and the tile 129 may be stored in the bank 0. Accordingly, neighbor tiles in a direction of an up, down, left, and right alignment based on a predetermined tile may be stored in different banks.

The tile reading unit 240 may read, from different banks, the successive tiles in the input image that are classified based on the tile reading unit. The tile outputting unit 250 may output, via a port, pixel information of pixels included in a read tile.

In this example, while a current tile is being outputted via the port from among successive tiles, the tile reading unit 240 may read a subsequent tile stored in a different bank. The tile outputting unit 250 may then output, via the port, the subsequent tile, immediately after the outputting of the current tile has been completed.

For example, to read the successive tiles in a direction of a left and right alignment, such as, the tile 1 and the tile 2, the tile reading unit 240 may read pixel information of pixels included in the tile 1 stored in the bank 3. The tile outputting unit 250 may output the pixel information of the pixels included in the read tile 1. In this example, the tile reading unit 240 may read pixel information of pixels included in the tile 2 stored in the bank 1, while the pixel information of pixels included in the tile 1 is being outputted via the port. The tile outputting unit 250 may output, via the port, the pixel information of pixels included in the tile 2 when the outputting of the tile 1 is completed.

Allocation of a memory address based on a tile unit will be described with reference to FIGS. 3 through 5.

FIG. 3 illustrates an example of a memory address that is configured in an order of a bank address, a row address, and a column address according to example embodiments.

Referring to FIG. 3, when bits indicating the memory address are configured in the order of the bank address, the row address, and the column address, the address allocating unit 210 may allocate the memory address to each of a plurality of tiles included in a bank. In this example, a single bank 310 may include 128×128 tiles. A single tile may include 16×4 pieces of luminance information Y and 16×2 pieces of chrominance information (U, V). In this example, a size of the tile may be 16×8.

FIG. 4 illustrates an example of a memory address that is configured in an order of a row address, a bank address, and a column address according to example embodiments.

Referring to FIG. 4, when bits indicating the memory address are configured in the order of the row address, the bank address, and the column address, the address allocating unit 210 may allocate the memory address to each of a plurality of tiles included in a bank. In this example, a single bank 410 may include 128×1 tiles. A single tile may include 16×4 pieces of luminance information Y and 16×2 pieces of chrominance information (U, V). In this example, a size of the tile may be 16×8.

Figure 5:
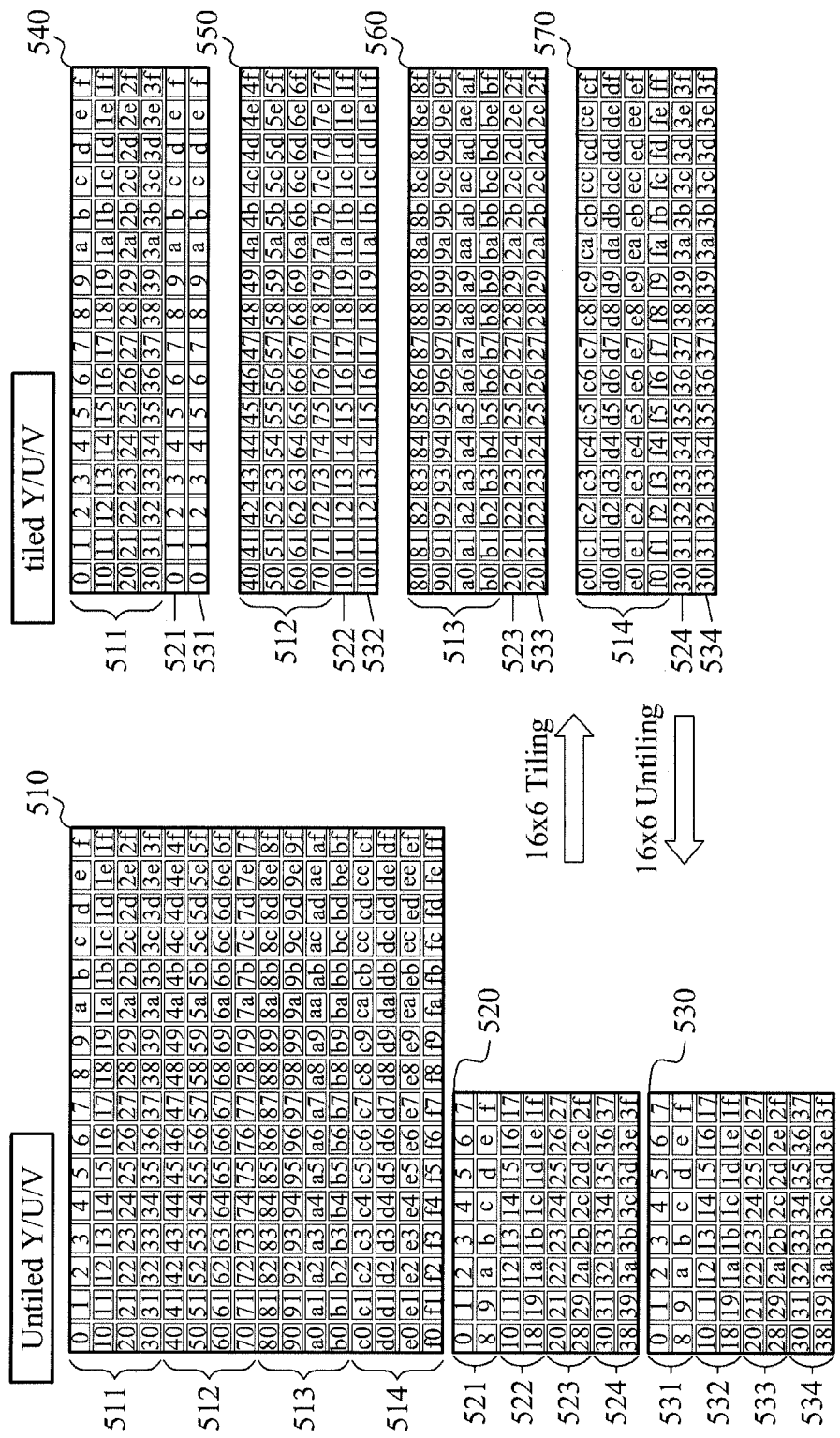
FIG. 5 is a diagram illustrating that a memory address is allocated based on tile unit in memory address structures of FIGS. 3 and 4 according to example embodiments.

FIG. 5 illustrates that a memory address is allocated based on a tile unit in memory address structures of FIGS. 3 and 4 according to example embodiments.

Referring to FIG. 5, the address allocating unit 210 may divide a macro block 510 based on a tile unit, and may allocate a memory address to each of the tiles, for example, a tile 540, a tile 550, a tile 560, and a tile 570. In this example, the macro block may include luminance information Y of a plurality of pixels. In this example, the address allocating unit 210 may generate a tile, based on luminance information Y of the pixels included in the macro block and chrominance information (U, V) corresponding to the luminance information Y.

For example, when a size of the macro block is 16×16, the address allocating unit 210 may perform 16×6 tiling with respect to the macro block to divide the macro block into four tiles, such as, the tile 540, the tile 550, the tile 560, and the tile 570. The first tile, 540, may include first luminance information 511 and first chrominance information (U, V) 521 and 531. The second tile, 550, may include second luminance information 512 and second chrominance information (U, V) 522 and 532. The third tile, 560, may include third luminance information 513 and third chrominance information (U, V) 523 and 533. The fourth tile, 570, may include fourth luminance information 514 and fourth chrominance information (U, V) 524 and 534. The address allocating unit 210 may allocate the memory address to each of the tiles.

Figure 6:
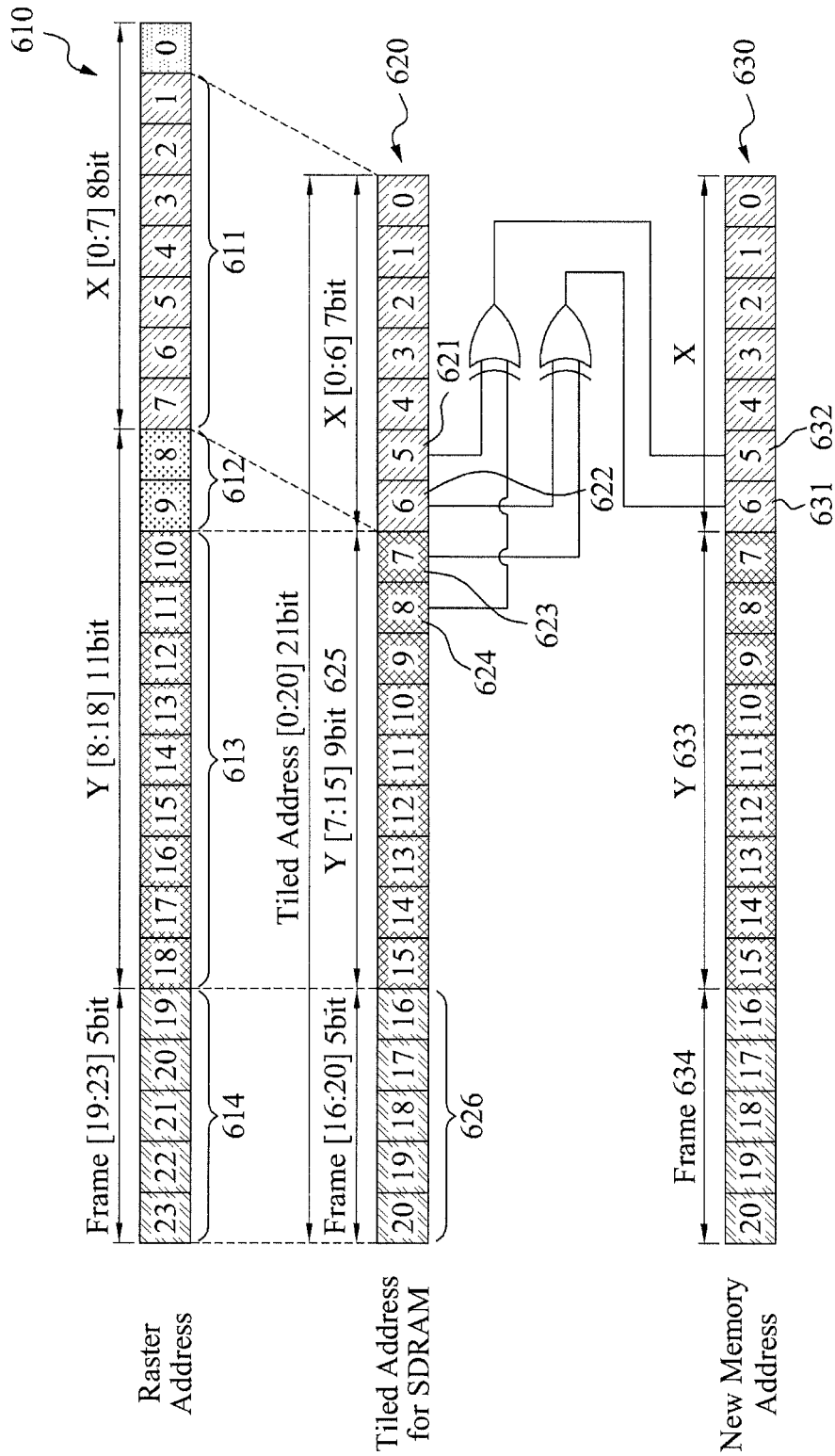
FIGS. 6 and 7 are diagrams illustrating a process that generates a new memory address based on an address allocated to a tile according to example embodiments.

Referring to FIG. 6, the address allocating unit 210 may allocate bits 611 indicating an X coordinate address in a memory address 610 allocated to a macro block, to bits 621 indicating an X coordinate address in a memory address of a tile, based on a raster address allocating scheme. The address allocating unit 210 may allocate remaining bits 613 excluding the least significant two bits 612 from bits indicating a Y coordinate address in the memory address 610 of the macro block, to bits 625 indicating a Y coordinate address in the memory address of the tile. In the same manner, the address allocating unit 210 may allocate bits 614 indicating a frame address in the memory address 610 of the macro block, to bits 626 indicating a frame address in the memory address of the tile.

Figure 7:
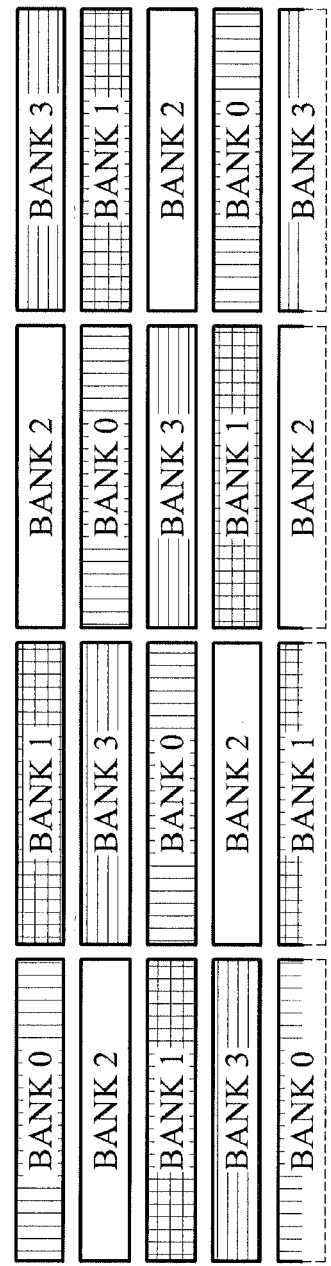

A bank interleaving process performed to store successive tiles in different banks will be describes with reference to FIGS. 6 and 7.

FIGS. 6 and 7 are diagrams illustrating a process that generates a new memory address based on an address allocated to a tile according to example embodiments.

The address generating unit 220 may generate a new memory address, based on an X coordinate address and a Y coordinate address of a tile, among a memory address allocated to each of a plurality of tiles. Referring to FIG. 6, the address generating unit 220 may generate the new memory address based on the least significant two bits 624 and 623 indicating a Y coordinate of the tile among bits 620 indicating the memory address and the most significant two bits 622 and 621 indicating an X coordinate address of the tile.

For example, the address generating unit 220 may perform an exclusive or (XOR) operation with respect to a least significant first bit 623 indicating the Y coordinate address of the tile and a most significant first bit 622 indicating the X coordinate address of the tile, and may allocate a result of the XOR operation to a most significant bit 631 indicating the X coordinate address of the new memory address. The address generating unit 220 may perform an XOR operation with respect to a least significant second bit 624 indicating the Y coordinate address and a most significant second bit 621 indicating the X coordinate address, and may allocate a result of the XOR operation to a most significant second bit 632 indicating the X coordinate address of the new memory address.

In this example, the address generating unit 220 may use bits 626 indicating the frame address and bits 625 indicating the Y coordinate address in the bits 620 indicating the memory address allocated to the tile, as bits indicating the frame address and bits indicating the Y coordinate address in the new memory address, respectively. The address generating unit 220 may store values stored in the bits 626 indicating the frame address in the memory address allocated to the tile in bits 634 indicating the frame address of the new memory address. The address generating unit 220 may store values stored in the bits 625 indicating the Y coordinate address in the memory address allocated to the tile, in the bits 634 indicating the Y coordinate address of the new memory address.

Successive tiles in a direction of an up, down, left, and right alignment among the plurality of tiles may be stored in different banks as illustrated in FIG. 7.

FIGS. 8 and 9 illustrate a process that outputs tiles stored in a memory bank according to example embodiments.

FIG. 8 illustrates a process that outputs tiles corresponding to an 8×8 block, and FIG. 9 illustrates a process that outputs tiles corresponding to a 16×16 block.

Referring to FIG. 8, tiles corresponding to the 8×8 block may be stored in different banks, such as, a bank 0, a bank 2, and a bank 1, based on corresponding new memory addresses. The tile reading unit 240 may read a tile from the bank 0, and the tile outputting unit 250 may output, via a port, the tile read from the bank 0. The tile reading unit 240 may read a tile stored in the bank 2 during a cycle 820, while the tile read from the bank 0 is being outputted.

In this example, the tile outputting unit 250 may output, via the port, the tile read from the bank 2 when outputting of the tile read from the bank 0 is completed. In this manner, the tile reading unit 240 may read a tile stored in the bank 1 in a cycle 840, while the tile read from the bank 2 is being outputted.

The tile outputting unit 250 may output, via the port, the tile read from the bank 1 at a point in time, 850, where outputting of the tile read from the bank 1 is completed. In a case where the tiles corresponding to the 8×8 block are outputted, when the tiles are stored in different banks, a cycle expended for reading and outputting the tiles may be reduced from 72 cycles to 54 cycles, when compared to the tiles which are stored in the same bank.

In the same manner, referring to FIG. 9, successive tiles among a 16×16 block may be stored in different banks, such as the bank 0, the bank 2, the bank 1, and the bank 3, based on new memory addresses. Even through the tiles corresponding to the 16×16 block may be stored in different banks or may be stored in the same bank, neighbor tiles in a direction of an up, down, left, and right alignment may be stored in different banks. When a command to output a plurality of tiles is received, the tile reading unit 240 may read a subsequent tile stored in a different bank during a cycle 910, while a current tile is being outputted. The tile outputting unit 250 may output the subsequent tile stored in the different bank at a point in time, 920, where the outputting of the current tile is completed. In a case where the tiles corresponding to the 16×16 block are outputted, when the tiles are stored in different banks, a cycle expended for reading and outputting the tiles may be reduced from 120 cycles to 84 cycles when compared to the tiles which are stored in the same bank.

Figure 10:
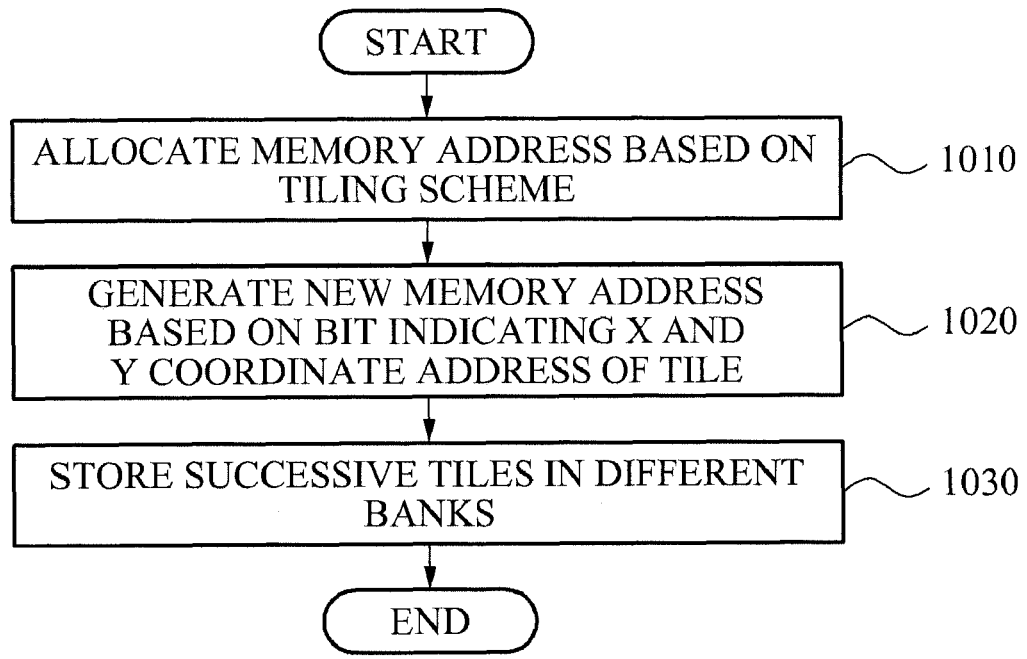
FIG. 10 is a flowchart illustrating a process that stores, in different banks, successive tiles in a plurality of tiles according to example embodiments.

FIG. 10 illustrates a process that stores, in different banks, successive tiles among a plurality of tiles according to example embodiments.

The address allocating unit 210 may allocate a memory address to each of a plurality of tiles based on a tiling scheme in operation 1010. In this example, the address allocating unit 210 may divide a macro block 510 into the plurality of tiles, and may allocate a memory address to each of the plurality of tiles. The address allocating unit 210 may allocate the memory address to be used for storing pixel information of a plurality of pixels included in a tile. In this example, pixel information may include luminance information Y and chrominance information (U, V) of a pixel.

The address generating unit 220 may generate a new memory address based on bits indicating an X coordinate address and a Y coordinate address of a tile in operation 1020. More specifically, the address generating unit 220 may generate a new memory address by performing a logical operation on bits indicating an X coordinate address and a Y coordinate address of a tile. In this example, the address generating unit 220 may generate new memory addresses to enable successive tiles, among the plurality of tiles in a direction of an up, down, left and right alignment based on a predetermined tile, to be stored in different banks.

For example, referring to FIG. 6, the address generating unit 220 may generate the new memory address by performing an XOR operation with respect to the most significant two bits indicating an X coordinate address and the least significant two bits indicating a Y coordinate address among bits 620 indicating the allocated memory address of a tile. In this example, the address generating unit 220 may allocate results of the XOR operation to most significant two bits 631 and 632 indicating the X coordinate address among bits 630 indicating the new memory address, respectively.

The memory controller 230 may store successive tiles in different banks based on the new memory addresses in operation 1030. The memory controller 230 may store pixel information of pixels included in each tile of a plurality of tiles, in a corresponding memory address based on bits 630 indicating the new memory address. Neighbor tiles in a direction of an up, down, left, and right alignment may be stored in different banks, based on the X coordinate address generated by the XOR operation as illustrated in FIG. 7.

Figure 11:
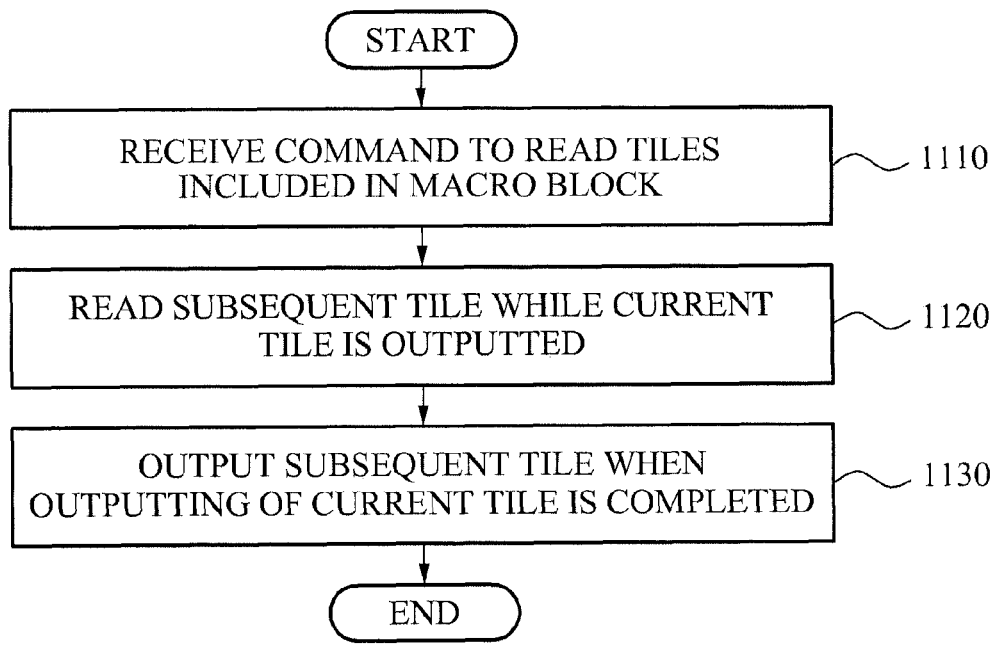
FIG. 11 is a flowchart illustrating a process that reads and outputs a plurality of successive tiles.

FIG. 11 illustrates a process that reads and outputs a plurality of successive tiles.

Referring to FIG. 11, the tile reading unit 240 may receive a reading command to read a plurality of tiles corresponding to a macro block in operation 1110. In this example, an input image may include a plurality of macro blocks, and a macro block may include a plurality of tiles.

The tile reading unit 240 may read a subsequent tile stored in a different bank, while a current tile is being outputted among the plurality of tiles for which the reading command is received in operation 1120. The tile outputting unit 250 may output the subsequent tile stored in the different tile when the outputting of the current tile is completed in operation 1130.

For example, referring to FIG. 9, when the tiles corresponding to the macro block are successive in a direction of an up and down alignment, and a command to read the tiles that are successive in the direction of the up and down alignment is received, the tile reading unit 240 may read a current tile stored in a bank 0 and may output a subsequent tile stored in a bank 2 when a point in time 920 where outputting of the current tile is completed. In this example, the tile reading unit 240 may read the subsequent tile stored in the bank 2 in a cycle 910, while the current tile is being outputted.

A memory access address translating apparatus may store successive tiles in different banks, and, while one of the successive tiles is being outputted, may read a different tile stored in a different bank. Accordingly, overhead caused by reading successive tiles stored in the same bank may be reduced.

The method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer or a processor using an interpreter. The described hardware devices may be configured to act as one or more software modules in order to perform the operations of the above-described embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the apparatus for translating a memory access address described herein.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for translating a memory access address, the apparatus comprising:
   an address allocating unit to classify a plurality of pixels included in an input image based on a tile unit and to allocate a memory address to each of a plurality of tiles, wherein each of the plurality of tiles includes pixel information associated with the plurality of pixels included in the input image;
   an address generating unit to generate a new memory address for each successive tile among the plurality of tiles based on a corresponding memory address allocated to each of the plurality of tiles, the new memory address being configured to enable the successive tiles to be stored in different memory banks,
   wherein the address generating unit generates new memory addresses by performing a logical operation on a bit indicating a Y coordinate address of a tile and a bit indicating an X coordinate address of the tile in the corresponding memory address allocated to each of the plurality of tiles; and
   a memory controller to store each of the successive tiles in a corresponding new memory address.

2. The apparatus of claim 1,
   wherein the corresponding memory address allocated to each of the plurality of tiles includes frame information associated with a frame that is associated with pixels included in the tile, the Y coordinate address of the tile, and the X coordinate address of the tile.

3. The apparatus of claim 1, wherein the address generating unit performs an exclusive or (XOR) operation with respect to at least one of the least significant two bits indicating a Y coordinate address of a tile and at least one of the most significant two bits indicating an X coordinate address of the tile respectively, and allocates results of the XOR operation to the most significant two bits indicating an X coordinate address of the new memory address, respectively.

4. The apparatus of claim 1, wherein the memory controller stores, in different banks based on the new memory addresses, the successive tiles that are successive in a direction of an up, down, left, or right alignment based on a tile of the plurality of tiles.

5. The apparatus of claim 1, further comprising:
   a tile reading unit to read, from different banks, the successive tiles of the plurality of tiles; and
   a tile outputting unit to output the read tiles.

6. The apparatus of claim 5, wherein the tile reading unit reads a subsequent tile that is stored in a different bank, while a current tile is being outputted among the successive tiles.

7. The apparatus of claim 5, wherein the tile outputting unit outputs the subsequent tile when the outputting of the current tile among the successive tiles has been completed.

8. A method of translating a memory access address, the method comprising:
   classifying a plurality of pixels included in an input image based on a tile unit and allocating a memory address to each of a plurality of tiles, wherein each of the plurality of tiles includes pixel information associated with the plurality of pixels included in the input image;
   generating a new memory address for each of the successive tiles among the plurality of tiles based on a corresponding memory address allocated to each of the plurality of tiles, the new memory address being configured to enable successive tiles of the plurality of tiles to be stored in different memory banks,
   wherein the generating of the new memory addresses further comprises performing a logical operation on a bit indicating a Y coordinate address of a tile and a bit indicating an X coordinate address of the tile in the corresponding memory address allocated to each of the plurality of tiles; and
   storing, by way of a memory controller, each of the successive tiles in a corresponding new memory address.

9. The method of claim 8,
   wherein the corresponding memory address allocated to each of the plurality of tiles includes frame information associated with a frame that is associated with pixels included in the tile, the Y coordinate address of the tile, and the X coordinate address of the tile.

10. The method of claim 8, wherein the generating comprises:
    performing an exclusive or (XOR) operation with respect to at least one of the least significant two bits indicating a Y coordinate address of a tile and at least one of the most significant two bits indicating an X coordinate address of the tile, respectively; and
    allocating results of the XOR operation to the most significant two bits indicating an X coordinate address of the new memory address, respectively.

11. The method of claim 8, wherein the storing comprises:
    storing, in different banks based on the new memory addresses, the successive tiles that are successive in a direction of an up, down, left, or right alignment based on a tile of the plurality of tiles.

12. The method of claim 8, further comprising:
    reading, from different banks, the successive tiles of the plurality of tiles; and
    outputting the read tiles.

13. The method of claim 12, wherein the reading comprises:
    reading a subsequent tile that is stored in a different bank, while a current tile is being outputted among the successive tiles.

14. The method of claim 12, wherein the outputting comprises:
    outputting the subsequent tile when the outputting of the current tile among the successive tiles has been completed.

15. A non-transitory computer-readable medium comprising a program for instructing a computer to perform the method of claim 8.

16. An apparatus for translating a memory access address, the apparatus comprising:
    an address allocating unit to classify a plurality of pixels included in an input image based on a tile unit, and to allocate a memory address to each of a plurality of tiles, wherein each of the plurality of tiles includes pixel information associated with the plurality of pixels included in the input image;
    an address generating unit to generate, for each successive tile among the plurality of tiles, a new respective memory address by performing a logical operation on a corresponding memory address allocated to each successive tile among the plurality of tiles,
    wherein the address generating unit generates new memory addresses by performing a logical operation on a bit indicating a Y coordinate address of a tile and a bit indicating an X coordinate address of the tile in the corresponding memory address allocated to each of the plurality of tiles; and
    a memory controller to store each of the successive tiles in different memory banks based on the new respective memory address.

17. The apparatus of claim 16, wherein the address generating unit performs an exclusive or (XOR) operation on one of a least significant two bits indicating a Y coordinate address of a tile and on one of a most significant two bits indicating an X coordinate address of the tile, and allocates results of the XOR operation to one of the most significant two bits indicating an X coordinate address of the new respective memory address.

18. A method for translating a memory access address, the method comprising:
- classifying a plurality of pixels included in an input image based on a tile unit;
- allocating a memory address to each of a plurality of tiles, wherein each of the plurality of tiles includes pixel information associated with the plurality of pixels included in the input image;
- generating, for each successive tile among the plurality of tiles, a new respective memory address by performing a logical operation on a corresponding memory address allocated to each successive tile among the plurality of tiles,
- wherein the generating further comprises generating new memory addresses by performing a logical operation on a bit indicating a Y coordinate address of a tile and a bit indicating an X coordinate address of the tile in the corresponding memory address allocated to each of the plurality of tiles; and
- storing, by way of a memory controller, each of the successive tiles in different memory banks based on the new respective memory address.

* * * * *